(12) United States Patent
Adriaenssens

(10) Patent No.: US 8,853,540 B2
(45) Date of Patent: Oct. 7, 2014

(54) CARBON NANOTUBE ENHANCED CONDUCTORS FOR COMMUNICATIONS CABLES AND RELATED COMMUNICATIONS CABLES AND METHODS

(75) Inventor: Luc Walter Adriaenssens, Frisco, TX (US)

(73) Assignee: CommScope, Inc. of North Carolina, Hickory, NC (US)

(*) Notice: Subject to any disclaimer, the term of this patent is extended or adjusted under 35 U.S.C. 154(b) by 278 days.

(21) Appl. No.: 13/446,728

(22) Filed: Apr. 13, 2012

(65) Prior Publication Data

US 2013/0105195 A1 May 2, 2013

Related U.S. Application Data

(60) Provisional application No. 61/476,825, filed on Apr. 19, 2011.

(51) Int. Cl.
| | |
|---|---|
| *H01B 5/00* | (2006.01) |
| *B21D 39/04* | (2006.01) |
| *H01B 13/00* | (2006.01) |
| *H01B 11/18* | (2006.01) |
| *H01B 1/04* | (2006.01) |
| *H01B 7/00* | (2006.01) |
| *C08K 3/04* | (2006.01) |
| *H01B 1/02* | (2006.01) |
| *H01B 7/18* | (2006.01) |

(52) U.S. Cl.
CPC ............ *H01B 11/1808* (2013.01); *H01B 13/00* (2013.01); *H01B 1/04* (2013.01); *H01B 7/0009* (2013.01); *C08K 3/04* (2013.01); *H01B 1/026* (2013.01); *H01B 5/00* (2013.01); *H01B 7/18* (2013.01); *Y10S 977/722* (2013.01); *Y10S 977/784* (2013.01)

USPC .......... 174/126.2; 228/126; 977/722; 977/784

(58) Field of Classification Search
CPC ............ B82Y 30/00; H01B 1/00; H01B 1/02; H01B 1/023; H01B 1/026
USPC ................. 174/126.2; 228/126; 977/722, 784
See application file for complete search history.

(56) References Cited

U.S. PATENT DOCUMENTS 3,355,796 A * 12/1967 Frieling, Jr. .................... 228/117
3,562,899 A * 2/1971 Kaiser et al. ................... 228/130
(Continued)

FOREIGN PATENT DOCUMENTS

| JP | 2004156074 A | * 6/2004 |
|---|---|---|
| JP | 2007-157372 A | 6/2007 |

(Continued)

OTHER PUBLICATIONS

Thostenson, Erik T., "Advances in the Science and Technology of Carbon Nanotubes and their Composites: a Review," *Composites Science and Technology* 61 (2001) pp. 1899-1912.

(Continued)

*Primary Examiner* — Jeremy C Norris
*Assistant Examiner* — Nathan Milakovich
(74) *Attorney, Agent, or Firm* — Myers Bigel Sibley & Sajovec, P.A.

(57) ABSTRACT

A conductor for a communications cable includes an elongated metal wire and a metal sheet that includes a plurality of carbon nanotubes that at least partially surrounds the elongated metal wire. The metal wire may include copper, and the metal sheet may likewise include copper and may be welded to an outside surface of the metal wire to surround the metal wire. This conductor may be used in a variety of communications cables that carry high frequency signals.

13 Claims, 4 Drawing Sheets

(56) References Cited

U.S. PATENT DOCUMENTS

| | | | |
|---|---|---|---|
| 3,714,701 A * | 2/1973 | Dion et al. | 228/130 |
| 4,227,061 A * | 10/1980 | Westfall et al. | 219/615 |
| 7,345,242 B2 * | 3/2008 | Chen | 174/11 OR |
| 7,413,474 B2 * | 8/2008 | Liu et al. | 439/579 |
| 7,491,883 B2 * | 2/2009 | Lee et al. | 174/28 |
| 7,651,766 B2 | 1/2010 | Chen | |
| 7,833,355 B2 | 11/2010 | Capizzo | |
| 7,875,801 B2 | 1/2011 | Tsotsis | |
| 7,875,802 B2 | 1/2011 | Tsotsis | |
| 7,897,876 B2 | 3/2011 | Tsotsis et al. | |
| 8,445,788 B1 * | 5/2013 | Tsotsis et al. | 174/126.1 |
| 8,604,340 B2 * | 12/2013 | Jiang et al. | 174/36 |
| 2002/0074932 A1 | 6/2002 | Bouchard et al. | |
| 2004/0020681 A1 * | 2/2004 | Hjortstam et al. | 174/102 SC |
| 2006/0061011 A1 | 3/2006 | Kikuchi et al. | |
| 2006/0099438 A1 * | 5/2006 | Arai et al. | 428/615 |
| 2007/0151744 A1 | 7/2007 | Chen | |
| 2007/0221706 A1 * | 9/2007 | Calliham | 228/101 |
| 2008/0093577 A1 | 4/2008 | Khraishi et al. | |
| 2008/0099239 A1 * | 5/2008 | Fong et al. | 174/391 |
| 2008/0251270 A1 * | 10/2008 | Lee et al. | 174/105 R |
| 2008/0251274 A1 * | 10/2008 | Lee et al. | 174/113 R |
| 2008/0254675 A1 | 10/2008 | Lee et al. | |
| 2008/0286560 A1 | 11/2008 | Huang et al. | |
| 2009/0197082 A1 * | 8/2009 | Jiang et al. | 428/367 |
| 2010/0052223 A1 | 3/2010 | Kim et al. | |
| 2010/0101832 A1 * | 4/2010 | Verhaverbeke et al. | 174/126.2 |
| 2010/0132977 A1 * | 6/2010 | Wiekhorst et al. | 174/113 R |
| 2010/0233472 A1 * | 9/2010 | Liu et al. | 428/336 |
| 2010/0240265 A1 * | 9/2010 | Zhou et al. | 439/887 |
| 2010/0270069 A1 * | 10/2010 | Shar et al. | 174/377 |
| 2011/0005808 A1 | 1/2011 | White et al. | |
| 2011/0034600 A1 | 2/2011 | Luo et al. | |
| 2011/0174519 A1 * | 7/2011 | Shah et al. | 174/119 |
| 2011/0203831 A1 * | 8/2011 | Schmidt et al. | 174/126.2 |
| 2011/0226509 A1 * | 9/2011 | Kim et al. | 174/126.2 |
| 2012/0000691 A1 * | 1/2012 | Shah et al. | 174/102 R |
| 2012/0043690 A1 * | 2/2012 | Wei et al. | 264/171.13 |
| 2012/0045644 A1 * | 2/2012 | Wei et al. | 428/368 |
| 2012/0152480 A1 * | 6/2012 | Nayfeh et al. | 164/61 |
| 2012/0247800 A1 * | 10/2012 | Shah et al. | 174/36 |
| 2012/0273255 A1 * | 11/2012 | Hemond et al. | 174/126.2 |
| 2013/0081678 A1 * | 4/2013 | Naito et al. | 136/252 |
| 2013/0104396 A1 * | 5/2013 | Fan et al. | 29/874 |
| 2013/0110212 A1 * | 5/2013 | Feng et al. | 607/119 |
| 2014/0080378 A1 * | 3/2014 | Wasynczuk | 442/379 |
| 2014/0131096 A1 * | 5/2014 | Silverman et al. | 174/74 R |

FOREIGN PATENT DOCUMENTS

| | | |
|---|---|---|
| JP | 2007179871 A * | 7/2007 |
| WO | WO 2013127444 A1 * | 9/2013 |

OTHER PUBLICATIONS

Bakshi, S. R., "Carbon Nanotube Reinforced Metal Matrix Composites—a Review," *International Materials Reviews*, vol. 55, (2010) pp. 41-64.

Research Paper, "Development of Carbon Nanotube Composite Cables for Ultra Deep Water Oil and Gas Fields," Los Alamos National Laboratory, Project No. 09121-3300-10, (2011).

Tan, Zhangiu, "Two-Dimensional Distribution of Carbon Nanotubes in Copper Flake Powders," *IOPScience*, 2011 Nanotechnology 22 225603.

International Preliminary Report on Patentability Corresponding to International Application No. PCT/US2012/033755; Date of Mailing: Oct. 31, 2013; 7 Pages.

Database WPI, Week 200763, Thomas Scientific, London, GB; AN 2007-668511 & JP 2007-157372 A (Nissan Motor Co. Ltd.), Jun. 21, 2007.

International Search Report Corresponding to International Application No. PCT/US2012/033755; Date of Mailing: Sep. 6, 2012; 11 Pages.

\* cited by examiner

CARBON NANOTUBE ENHANCED CONDUCTORS FOR COMMUNICATIONS CABLES AND RELATED COMMUNICATIONS CABLES AND METHODS

CLAIM OF PRIORITY

The present application claims priority under 35 U.S.C. §119 to U.S. Provisional Patent Application Ser. No. 61/476,825, filed on Apr. 19, 2011, the entire contents of which is incorporated herein by reference as if set forth fully herein.

FIELD OF THE INVENTION

The present invention relates generally to communications systems and, more particularly, to conductors and cables for communications systems that exhibit enhanced conductivity.

BACKGROUND

A variety of communications cables are well known in the art. Many such communications cables are designed to carry high frequency signals such as, for example, signals with center frequencies of 100 MHz or more. Two types of communications cables are primarily used to carry such high frequency signals, namely (1) communications cables that include metal conductive wires and (2) fiber optic communications cables.

A variety of different conductive wire-based communications cables are known in the art, with two of the most widely used being coaxial cables and twisted pair cables. Typically, the conductive wires used in both coaxial and twisted pair cables use pure copper wires or wires formed of copper alloys, as copper is highly conductive and relatively inexpensive (e.g., as compared to silver which is more conductive but far more expensive). In order to reduce the weight or expense of a communications cable, in some cases copper or copper alloys may be plated onto the outside of another lighter and/or cheaper metal wire such as, for example, aluminum.

As a demand for communications systems that operate at higher frequencies and/or data rates increases, a need exists for communications cables that support these higher data rates without prohibitive increases in the expense, size and/or weight of the communications cables.

SUMMARY

Pursuant to embodiments of the present invention, conductors for communications cables are provided that include an elongated metal wire and a metal sheet that includes a plurality of carbon nanotubes on the elongated metal wire.

In some embodiments, the metal wire may be a copper wire, a copper alloy wire, or a copper or copper alloy plated wire (i.e., a copper plated or copper alloy plated aluminum wire). The metal sheet may be a metal tape selected from the group of a copper tape or a copper alloy tape. The carbon nanotubes may be embedded in the metal tape and/or plated onto the metal tape. The metal tape may completely surround the elongated metal wire. The elongated metal wire may have a substantially circular cross-section, and the metal tape may comprise a first metal tape that surrounds approximately half the circumference of the elongated metal wire and a separate, second metal tape that surrounds approximately the other half the circumference of the elongated metal wire.

In some embodiments, the axial direction of the carbon nanotubes may be generally aligned with a longitudinal axis of the elongated metal wire. The metal sheet may be welded to an exterior surface of the elongated metal wire. The elongated metal wire may have a hollow center.

According to further embodiments of the present invention, coaxial cables are provided that include a center conductor, an outer conductor that surrounds the center conductor, a dielectric layer that is disposed between the center conductor and the outer conductor, and an outer jacket. The center conductor of these coaxial cables may comprise an elongated metal wire and a metal sheet that includes a plurality of carbon nanotubes on the elongated metal wire. In some embodiments of these coaxial cables, the outer conductor may comprise an elongated hollow metal wire and an elongated metal tape that includes a plurality of carbon nanotubes that is welded to an exposed surface of the elongated hollow metal wire.

Pursuant to still further embodiments of the present invention, communications cables are provided that include at least one twisted pair of insulated conductors that are contained within a cable jacket, wherein each of the conductors of the pair of insulated conductors comprises an elongated metal wire and a metal sheet that includes a plurality of carbon nanotubes on the elongated metal wire.

Pursuant to still further embodiments of the present invention, methods of forming a conductor of a communications cable are provided in which an elongated metal sheet is formed that includes a plurality of carbon nanotubes. An elongated metal wire is provided, and then at least one of the elongated metal sheet and the elongated metal wire are heated. The elongated metal sheet may then be bonded to the elongated metal wire.

In some embodiments, these methods may include performing at least one process to improve an alignment of the plurality of carbon nanotubes along a longitudinal axis of the elongated metal sheet. This process (or processes) may be performed before, during and/or after the formation of the elongated metal sheet. The heating of at least one of the elongated metal sheet and the elongated metal wire may comprise heating the elongated metal sheet to at least a first temperature that is sufficient to at least partially melt a surface of the elongated metal sheet and heating the elongated metal wire to at least a second temperature that is sufficient to at least partially melt a surface of the elongated metal wire. The elongated metal wire may have a generally circular cross-section, where a width of the elongated metal sheet is approximately one-half the outer circumference (or, in some cases, an inner circumference) of the elongated metal wire, where bonding the elongated metal sheet to the elongated metal wire comprises welding the elongated metal sheet to cover approximately one-half the outer (or inner) circumference of the elongated metal wire. The method may further include welding a second elongated metal sheet to substantially cover the remainder of the outer (or inner) circumference of the elongated metal wire.

Pursuant to yet further embodiments of the present invention, coaxial cables are provided that include a center conductor, an outer conductor that surrounds the center conductor, a dielectric layer that is disposed between the center conductor and the outer conductor, and an outer jacket. The outer conductor comprises an elongated hollow metal wire having an exterior surface and an interior surface and a metal sheet that includes a plurality of carbon nanotubes that is on the interior surface of the elongated hollow metal wire. In some embodiments, the metal wire has an exposed surface that includes copper, and the metal sheet includes copper. Moreover, the axial direction of the carbon nanotubes may be generally aligned with a longitudinal axis that is defined by the elongated hollow metal wire.

DETAILED DESCRIPTION

Pursuant to embodiments of the present invention, conductors for communications cables are provided that may exhibit significantly enhanced conductivity, particularly at high frequencies. These conductors are formed by welding or otherwise bonding a thin, elongated metal sheet such as a metal tape onto an outside surface of an elongated metal wire so that the metal tape at least partially surrounds the elongated metal wire. The thin metal tape may include a large number of carbon nanotubes either embedded therein and/or plated onto the metal tape.

As is known to those of skill in the art, carbon nanotubes are structural bodies formed of carbon atoms that may have a generally cylindrical shape. The diameter of the cylindrical structure may be on the order of for example, a few nanometers to a few hundred nanometers, while the length of the cylindrical structure may be much larger such as, for example, thousands or millions of times the diameter (e.g., tens or hundreds of microns). Carbon nanotubes may exhibit unique electrical properties, including conductivity along the length of the carbon nanotube that may be 1000 times greater than copper for the same area (or volume). Carbon nanotubes are commercially available in large quantities from a variety of sources including, for example, Mitsui & Co., Ltd. (Tokyo, Japan) and Bayer AG (Leverkusen, Germany). Carbon nanotubes may be plated in order to maintain conductivity even in the presence of imperfect internal lattice structures. The term carbon nanotubes as used herein is inclusive of such plated carbon nanotubes.

For high frequency communications, nearly all of the energy of an electrical signal will travel on or about the surface of an electrical conductor due to a phenomena known as the "skin effect" that is caused by eddy currents that are generated by the alternating current characteristic of the high frequency signal. As high frequency electrical signals flow primarily in only a small portion of a metal conductor, the effective resistance of the conductor may be significantly increased since nearly all of the current must flow through a small portion of the conductor.

Figure 6:
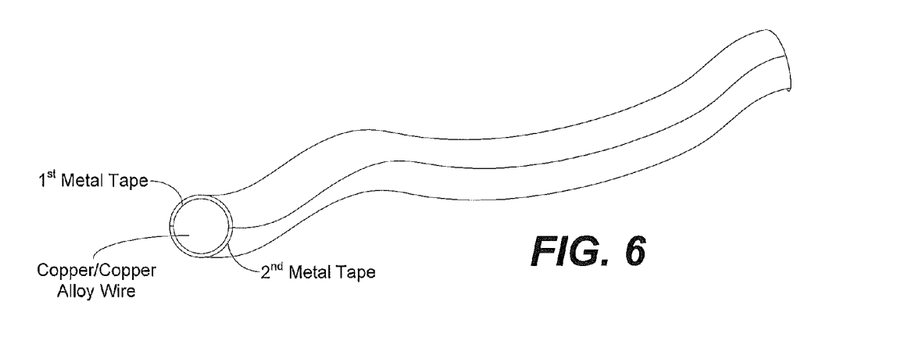
FIG. 6 is a perspective view of a conductor for a communications cable according to embodiments of the present invention.

Pursuant to embodiments of the present invention, conductors for high frequency communications signals are provided that include a metal core that has a carbon nanotube enhanced metal sheet (e.g., a metal tape) bonded to an exposed surface of the metal core. In some embodiments, the metal core may comprise a copper wire, a copper alloy wire, a copper plated wire (e.g., a copper plated aluminum wire) or a copper alloy plated wire (e.g., an aluminum wire plated with a copper alloy). The metal sheet may be a thin copper or copper alloy tape that has the carbon nanotubes embedded therein and/or deposited thereon. As shown in FIG. 6, in some embodiments, the metal sheet may comprise two separate metal tapes, the first of which is bonded along the longitudinal length of the top half of the copper/copper alloy wire core, while the second metal tape is bonded along the longitudinal length of the bottom half of the copper/copper alloy wire core so that the two tapes may substantially or completely surround the copper/copper alloy wire core. More than two metal tapes may also be used. The wire core may also be hollow to reduce material usage. With respect to a hollow metal wire, the exposed surface that receives the metal tape with the carbon nanotubes may be, for example, the exterior surface of the hollow metal core or the interior surface of the hollow metal core.

In some embodiments, the metal sheet/tape may be manufactured so that the carbon nanotubes have enhanced alignment along at least one direction (i.e., the carbon nanotubes have a preference to generally align to be parallel to the x-axis, but may be randomly aligned with respect to the y-axis and the z-axis). In some embodiments, the carbon nanotubes may have enhanced alignment along two directions so that the carbon nanotubes have a preference to generally align along the axis of the wire core. Techniques for aligning carbon nanotubes are known in the art and hence will not be discussed further herein. The metal tape(s) may be welded to the exterior of the wire core by, for example, bringing the carbon nanotube containing metal tape and the wire core together while heating the metal tape and/or the wire core to a temperature that is sufficient to at least partially melt a surface of the metal tape and an exposed surface of the wire core so that the two materials coalesce to have a common crystallographic structure.

The above-described conductors may exhibit substantially improved conduction of high frequency communications signals. As noted above, a high frequency signal will tend to congregate on the exposed surface(s) of the conductor. By providing carbon nanotubes to an appropriate depth (e.g., 260 microinches) along the exposed surface of the conductor, substantially improved conductivity may be achieved at high frequencies (e.g., 100 MHz). Even very thin depths (e.g., 100 microinches) along the surface of the conductor may substantially improve conductivity at higher frequencies (e.g., 700 MHz). Moreover, by processing the metal sheet/tape so that the carbon nanotubes have a preference to be aligned along the axial direction of the conductor, the conductivity may be further enhanced.

Methods of plating metal wires for communications cables are already known in the art. For example, copper plated aluminum wires are used in certain communications cables in order to take advantage of the lower cost and/or weight of aluminum as compared to copper. The copper (or a copper alloy) is typically plated onto the aluminum wire core using a welding process whereby a molten copper coating is applied to an aluminum wire core that is likewise heated to a temperature at which the aluminum on the surface starts to melt so that the copper and aluminum coalesce. This method or similar methods may be used to weld the carbon nanotube containing metal sheet to partially or completely surround an outside surface of a metal wire core. Moreover, since both the metal wire core and the carbon nanotube containing metal sheet may use copper or a copper alloy as the base metal, a very strong weld may be achieved between the wire core and the metal sheet.

Figure 1A:
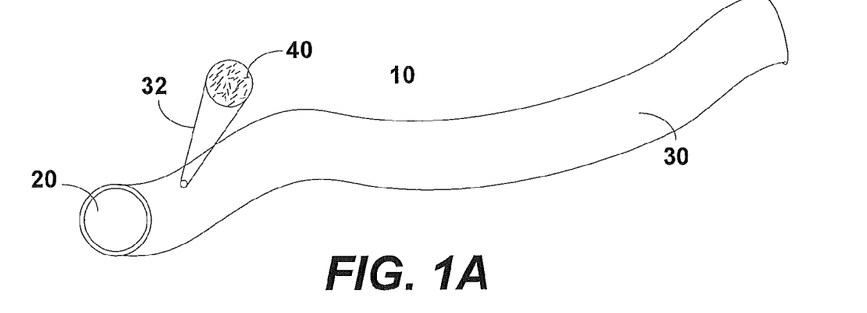
FIG. 1A is a perspective view of a conductor for a communications cable according to embodiments of the present invention.
Figure 1B:
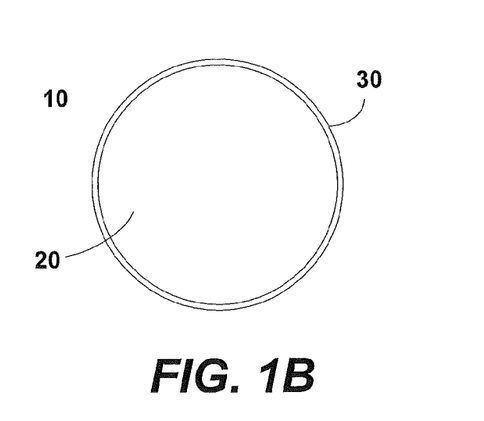
FIG. 1B is an enlarged, cross-sectional view of the conductor of FIG. 1A.

FIG. 1A is a perspective view of a conductor 10 for a communications cable according to embodiments of the present invention. FIG. 1B is a cross-sectional view of the conductor 10 of FIG. 1A.

As shown in FIG. 1A, the conductor 10 comprises a metal wire core 20 that has a metal sheet 30 bonded to an outside surface thereof. The metal wire core 20 may have a generally circular cross-section in some embodiments, and may have a length that far exceeds the diameter of the cross-section. In some embodiments, the metal wire core 20 may comprise a copper wire or a wire formed of a copper alloy. In other embodiments, the metal wire core 20 may comprise a copper plated metal wire core such as, for example, a copper plated aluminum wire. In some embodiments, the metal wire core 20 may comprise a solid metal wire core, while in other embodiments (not shown) the metal wire core 20 may have a hollow central section such that the metal wire core 20 has an annular cross-section. Thus, it will be appreciated that herein the terms "wire" and "wire core" encompass both solid wires/wire cores and wires/wire cores that have a hollow center such as the outer conductor of a coaxial cable. It will also be appreciated that the term "wire" may comprise a single wire or may comprise a plurality of wires or other conductors that are braided or otherwise formed together.

The metal sheet 30 may comprise, for example, a thin metal tape that is formed of, for example, copper or a copper alloy. The metal sheet 30 may be bent into a circular shape so as to surround (or, alternatively, partially surround) an exposed surface of the metal wire core 20. In such embodiments, the ends of the metal sheet 30 may be welded together to provide metal sheet 30 having an annular cross-section. As illustrated in the callout 32 of FIG. 1A, in some embodiments, carbon nanotubes 40 may be embedded in or on a surface of the metal sheet 30. In other embodiments, carbon nanotubes 40 may be plated onto one or both major surfaces of the metal sheet 30. The carbon nanotubes 40 may have a preference to generally align along an axis defined by the axis of the metal wire core 20.

Figure 2:
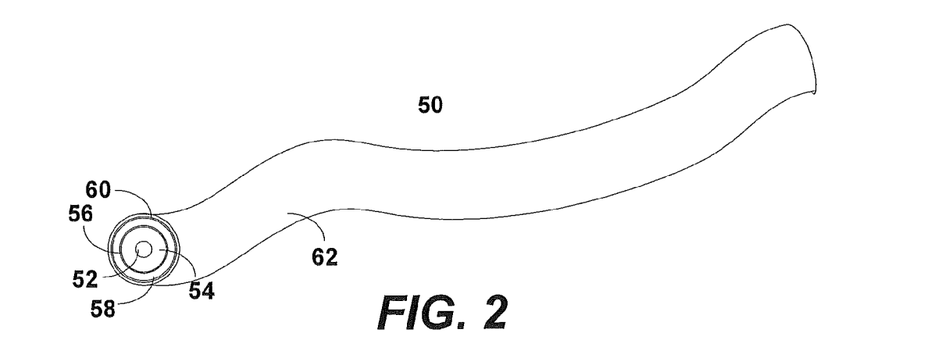
FIG. 2 is a perspective view of a coaxial cable according to embodiments of the present invention.

The conductors according to embodiments of the present invention may be used in a variety of communications cables, specifically including coaxial cables. FIG. 2 is a perspective view of a coaxial cable 50 that has both a center conductor and an outer conductor that are formed using carbon nanotube enhanced conductors according to embodiments of the present invention.

As shown in FIG. 2, the coaxial cable 50 includes a central conductor 52 that is surrounded by a dielectric 54. A tape 56 may be preferentially bonded to the dielectric 54. An outer conductor 58 that acts as a return conductor and as an electrical shield surrounds the tape 56. One or more optional electrical shielding tapes 60 may surround the outer conductor 58. The outer conductor 58 may be corrugated in order to improve overall cable flexibility. A cable jacket 62 (or other insulative protective layer such as, for example, an enamel coating) may surround the outer conductor 58 and any electrical shielding tapes 60. The conductor 10 of FIGS. 1A and 1B may be used as the central conductor 52 of coaxial cable 50. The central conductor 52 may also be corrugated in order to improve overall cable flexibility. The carbon nanotubes provided on or at an exposed surface of the central conductor (e.g., surrounding the outer surface of the central conductor 52) may enhance the conductivity of the central conductor 52, especially at high frequencies.

Figure 3:
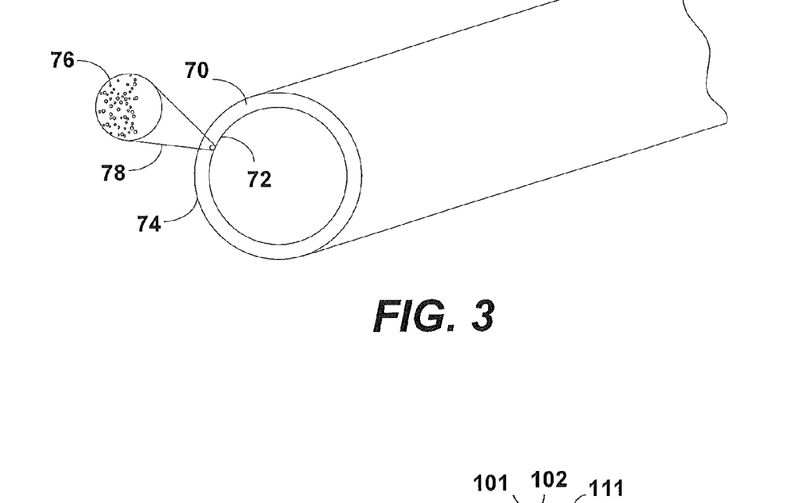
FIG. 3 is a perspective view of one embodiment of the outer conductor of the coaxial cable of FIG. 2.

FIG. 3 is a perspective view of one embodiment of the outer conductor 58 of the coaxial cable 50 of FIG. 2. As shown in FIG. 3, the outer conductor 58 may comprise a metal sheet 70 that is formed into an annular shape so as to have an inner surface 72 and an outer surface 74. A plurality of carbon nanotubes 76 may be deposited onto at least the inner surface 72 of the metal sheet 70. Such a plurality of carbon nanotubes 76 are graphically illustrated as being provided at the inner surface of the metal sheet 70 in the callout 78 provided in FIG. 3. As shown in the callout 78, the carbon nanotubes 76 may only be provided in the surface region of the outer conductor 58. These carbon nanotubes 76 may, in some embodiments, be more aligned along the axis defined by the central conductor 52 than in other directions.

Figure 7:
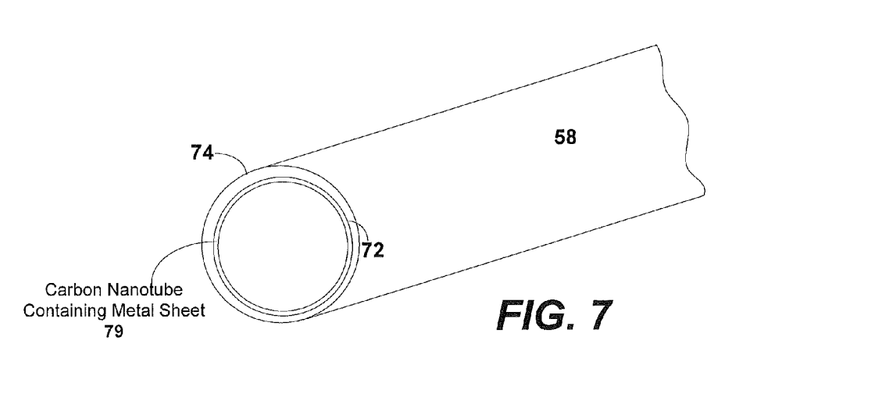
FIG. 7 is a perspective view of a hollow outer conductor of a coaxial cable according to embodiments of the present invention that has a carbon nanotube containing metal sheet bonded to the inner surface thereof.

As noted above, in some embodiments (and particularly in embodiments that use larger gauge wires for the central conductor), the central conductor 52 may have a hollow central region. In such embodiments, the central conductor 52 may appear identical (except in diameter) to the outer conductor 58 depicted in FIG. 3. As with the outer conductor 58 depicted in FIG. 3, such an annular central conductor 52 may have carbon nanotube containing metal sheet(s) bonded to at least one of the exposed surfaces of the central conductor 52 (i.e., a carbon nanotube containing metal sheet 79 bonded to the inner surface 72 or to the outer surface 74, as shown in FIG. 7).

Figure 4A:
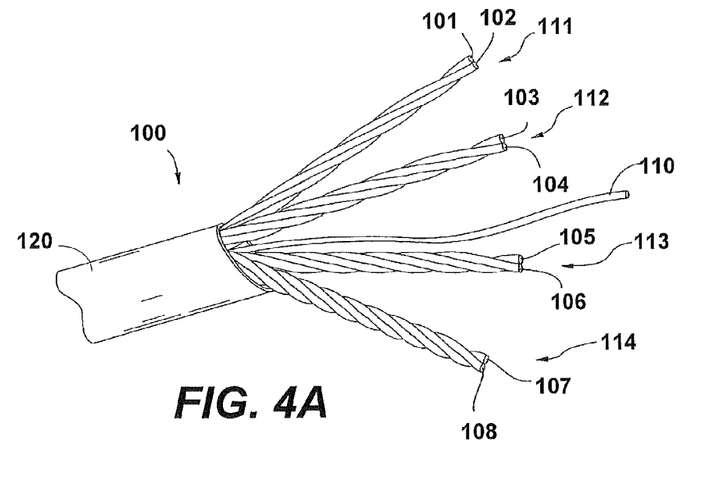
FIG. 4A is a perspective view of a twisted pair cable according to embodiments of the present invention, where a jacket thereof is partially removed to show four twisted wire pairs and a separator of the cable.
Figure 4B:
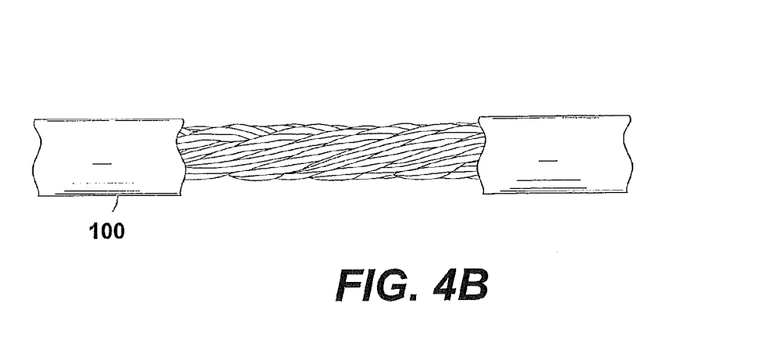
FIG. 4B is an enlarged, fragmentary, side view of the cable of FIG. 4A with a portion of the jacket removed to show a twisted core of the cable.

The conductors according to embodiments of the present invention may also be used in twisted pair communications cables such as the so-called "Ethernet" cables that are commonly used in local area networks and various other applications. FIG. 4A is a perspective view of a carbon nanotube enhanced twisted pair cable 100 according to embodiments of the present invention, where a jacket thereof is partially removed to show the four twisted wire pairs and an optional separator that are included in the cable 100. FIG. 4B is an enlarged, fragmentary, side view of the cable 100 of FIG. 4A with a portion of the cable jacket removed.

As shown in FIGS. 4A and 4B, the cable 100 includes a total of eight conductors 101-108 that are arranged as four twisted pairs of conductors 111, 112, 113, 114. Each conductor 101-108 may include an outer insulation. A separator such as a separator tape or flute 110 may be included that separates at least some of the twisted pairs 111-114 from other of the twisted pairs 111-114. The twisted pairs 111-114 may be twisted together to provide a core twist. The twisted core including twisted pairs 111-114 and separator 110 may be enclosed in a cable jacket 120. One or more of the twisted pairs may be wrapped in a foil shield (not shown). Similarly, the twisted core may be wrapped in a foil shield and/or covered by a metallic braid. Some or all of the conductors 101-108 may be implemented using the conductor 10 of FIGS. 1A and 1B. The carbon nanotubes provided on or at an outer surface of each conductor 101-108 that is implemented in this fashion may enhance the conductivity of the conductor.

Figure 5:
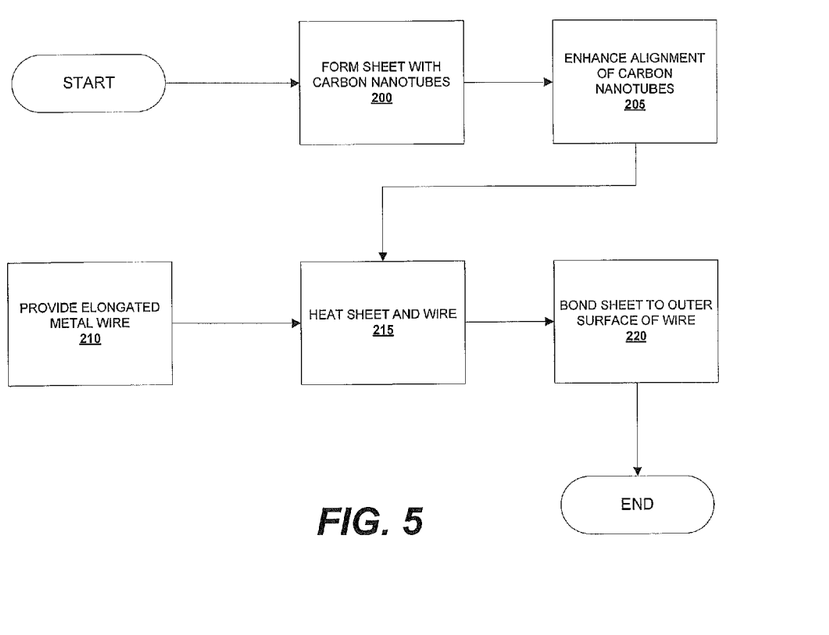
FIG. 5 is a flowchart diagram illustrating a method of making a conductor for a communications cable according to certain embodiments of the present invention.

FIG. 5 is a flowchart diagram illustrating a method of making a conductor for a communications cable according to certain embodiments of the present invention. As shown in FIG. 5, operations may begin with a process that is used to form an elongated metal sheet that includes a plurality of carbon nanotubes (block 200). The carbon nanotubes may be deposited onto one or both major surfaces of the metal sheet and/or embedded within the metal sheet. Either before, during or after the formation of this metal sheet, one or more processes may be performed to improve an alignment of the plurality of carbon nanotubes along a longitudinal axis of the elongated metal sheet, which is the axis of the metal sheet that will be coincident with the axis of an elongated metal wire of the conductor (block 205). An elongated metal wire such as, for example, a copper wire, a copper alloy wire or a copper-plated aluminum wire is provided (block 210), and then at least one of the elongated metal sheet and the elongated metal wire are heated (block 215). In some embodiments, the elongated metal sheet may be heated to at least a first temperature that is sufficient to at least partially melt a surface of the elongated metal sheet and the elongated metal wire may be heated to at least a second temperature that is sufficient to at least partially melt a surface of the elongated metal wire. The elongated metal sheet may then be bonded to the elongated metal wire using, for example, a welding process (block 220).

While the present invention is described above with reference to drawings that illustrate preferred embodiments thereof, it will be appreciated that the present invention may be embodied in many different forms and should not be construed as limited to the embodiments set forth herein. Instead, these embodiments are provided so that this disclosure will be thorough and complete, and will fully convey the scope of the invention to those skilled in the art.

In the drawings, the size of lines and elements may be exaggerated for clarity. It will also be understood that when an element is referred to as being "coupled" to another element, it can be coupled directly to the other element, or intervening elements may also be present. In contrast, when an element is referred to as being "directly coupled" to another element, there are no intervening elements present. Likewise, it will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A conductor for a communications cable, comprising:
an elongated metal wire;
a metal sheet that includes a plurality of carbon nanotubes that is directly on an exposed surface of the elongated metal wire,
wherein the elongated metal wire has a hollow center, and
wherein the metal sheet is bonded to an interior surface of the elongated metal wire that is exposed by the hollow center.

2. The conductor of claim 1, wherein the elongated metal wire comprises a copper wire, a copper alloy wire, a copper plated wire or a copper alloy plated wire.

3. The conductor of claim 2, wherein the metal sheet comprises a metal tape selected from the group of a copper tape or a copper alloy tape.

4. The conductor of claim 3, wherein the carbon nanotubes are embedded in the metal tape and/or plated onto the metal tape.

5. The conductor of claim 4, wherein the metal tape completely surrounds the elongated metal wire.

6. The conductor of claim 5, wherein the elongated metal wire has a substantially circular cross-section, and the metal tape comprises a first metal tape that surrounds approximately half the circumference of the elongated metal wire and a separate, second metal tape that surrounds approximately the other half of the circumference of the elongated metal wire.

7. The conductor of claim 1, wherein the an axial direction of the carbon nanotubes is generally aligned with a longitudinal axis of the elongated metal wire.

8. The conductor of claim 1, wherein the metal sheet is welded to an exterior surface of the elongated metal wire.

9. The conductor of claim 1, wherein the elongated metal wire comprises a copper-plated aluminum wire.

10. A coaxial cable comprising:
a center conductor;
an outer conductor that surrounds the center conductor;
a dielectric layer that is disposed between the center conductor and the outer conductor, and
an outer jacket,
wherein the center conductor comprises an elongated metal wire and a metal sheet that includes a plurality of carbon nanotubes on the elongated metal wire, and
wherein the outer conductor comprises an elongated hollow metal wire; and an elongated metal tape that includes a plurality of carbon nanotubes which is welded to an exposed surface of the elongated hollow metal wire.

11. A method of forming a conductor of a communications cable, the method comprising:
plating a plurality of carbon nanotubes onto an exposed surface of a first elongated metal sheet and onto an exposed surface of a second elongated metal sheet;
providing an elongated metal wire that has a generally circular cross-section;
heating at least one of the elongated metal wires or the first and second elongated metal sheets;
welding the first elongated metal sheet onto a top half of an outer circumference of the elongated metal wire and welding the second elongated metal sheet onto a bottom half of the outer circumference of the elongated metal wire,
wherein the elongated metal wire comprises an elongated copper wire and the first and second elongated metal sheets comprise first and second elongated copper sheets.

12. The method of claim 11, further comprising performing at least one process to improve an alignment of the plurality of carbon nanotubes along a longitudinal axis of the first elongated metal sheet, wherein the at least one process is performed before, during and/or after the formation of the first elongated metal sheet.

13. The method of claim 12, wherein heating at least one of the elongated metal wires or the first and second elongated metal sheets comprises heating the first and second elongated metal sheets to at least a first temperature that is sufficient to at least partially melt a surface of the first and second elongated metal sheets and heating the elongated metal wire to at least a second temperature that is sufficient to at least partially melt a surface of the elongated metal wire.

* * * * *

UNITED STATES PATENT AND TRADEMARK OFFICE
CERTIFICATE OF CORRECTION

| | | |
|---|---|---|
| PATENT NO. | : 8,853,540 B2 | Page 1 of 1 |
| APPLICATION NO. | : 13/446728 | |
| DATED | : October 7, 2014 | |
| INVENTOR(S) | : Adriaenssens | |

It is certified that error appears in the above-identified patent and that said Letters Patent is hereby corrected as shown below:

In the Claims:

Column 8, Claim 7, Line 19: Please correct "wherein the an axial"
to read -- wherein an axial --

Column 8, Claim 10, Line 36: Please correct "metal wire; and an"
to read -- metal wire and an --

Signed and Sealed this
Third Day of March, 2015

Michelle K. Lee
*Deputy Director of the United States Patent and Trademark Office*